United States Patent [19]

Tournere

[11] 3,759,633

[45] Sept. 18, 1973

[54] DEVICE FOR LOCKING BLADES OR OTHER SLIDINGLY MOUNTED PARTS IN POSITION ON A ROTOR OR OTHER ROTATING SUPPORT MEANS

[75] Inventor: Marcel Joseph Tournere, Paris, France

[73] Assignee: Societe Nationale D'Etude Et De Construction De Moteurs D'Aviation, Paris, France

[22] Filed: Jan. 5, 1972

[21] Appl. No.: 215,561

[30] Foreign Application Priority Data
Jan. 6, 1971 France .............................. 7100227

[52] U.S. Cl................. 416/220, 416/221, 416/206, 287/52.05
[51] Int. Cl............................................. B63h 1/20
[58] Field of Search ....................416/219-221, 206; 287/52.05, 53, DIG. 5

[56] References Cited
UNITED STATES PATENTS
2,651,494   9/1953   Persson............................. 416/220
2,846,183   8/1958   Morgan............................. 416/221

FOREIGN PATENTS OR APPLICATIONS
976,790   11/1950   France .............................. 416/221

Primary Examiner—Everette A. Powell, Jr.
Attorney—William J. Daniel

[57] ABSTRACT

A device for the axial locking of a blade in position in a slot made in a rotor in an engine with a horizontal axis, the device comprising two balls each retractable within and movable under the influence of gravitational and centrifugal forces along one of two recesses extending radially, one of which is made in the rotor facing a blade root cavity and the other of which is made in the blade root facing a cavity in the rotor, the cavities having a depth which is less than the diameter of the balls.

5 Claims, 8 Drawing Figures

FIG.:1
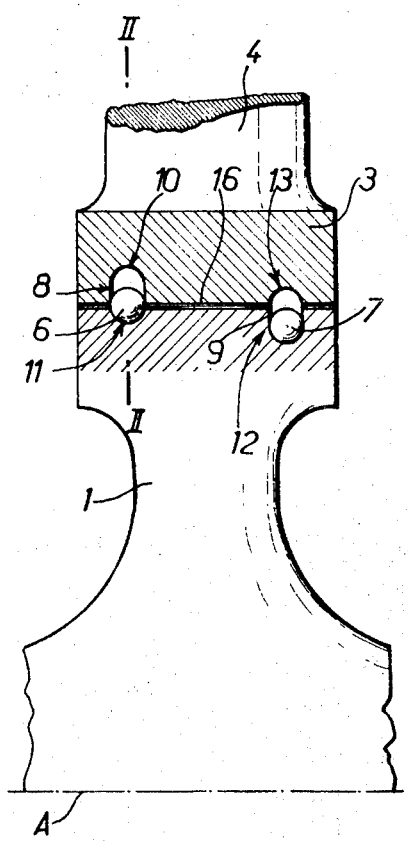
FIG.:2
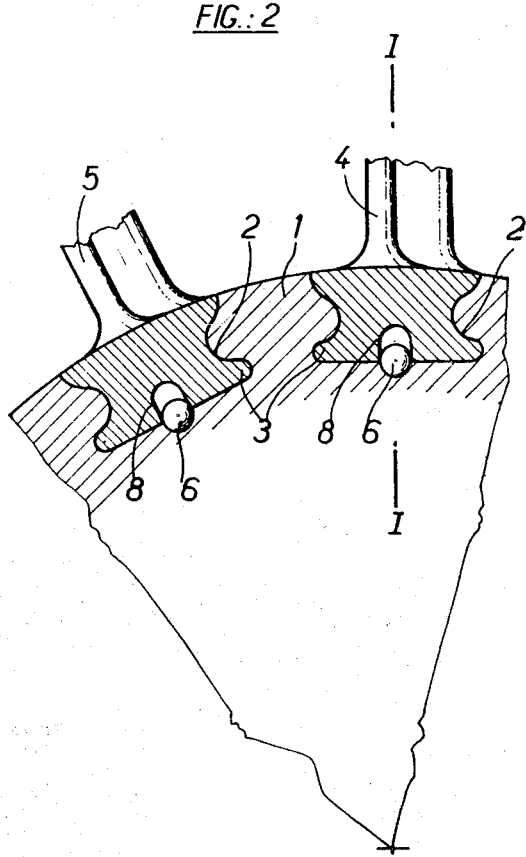
FIG.:1a
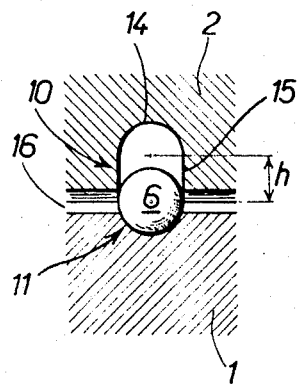
FIG.:1b
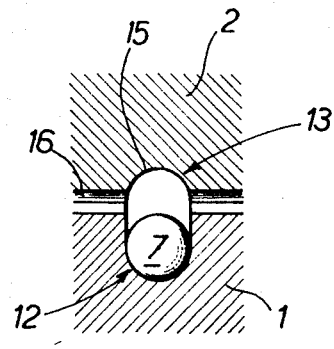

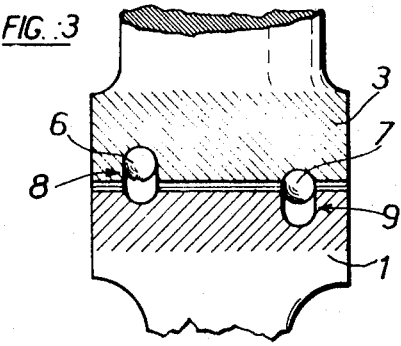
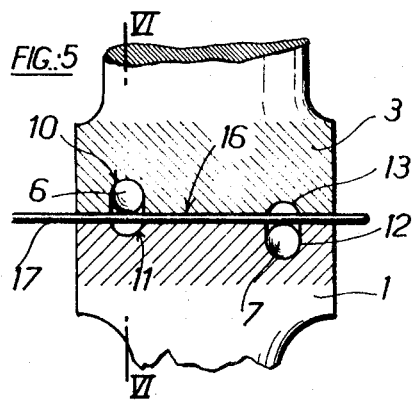
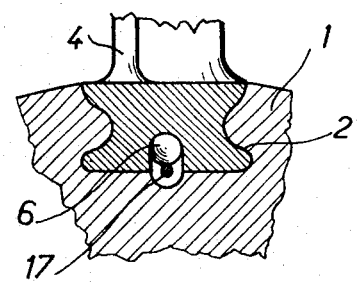
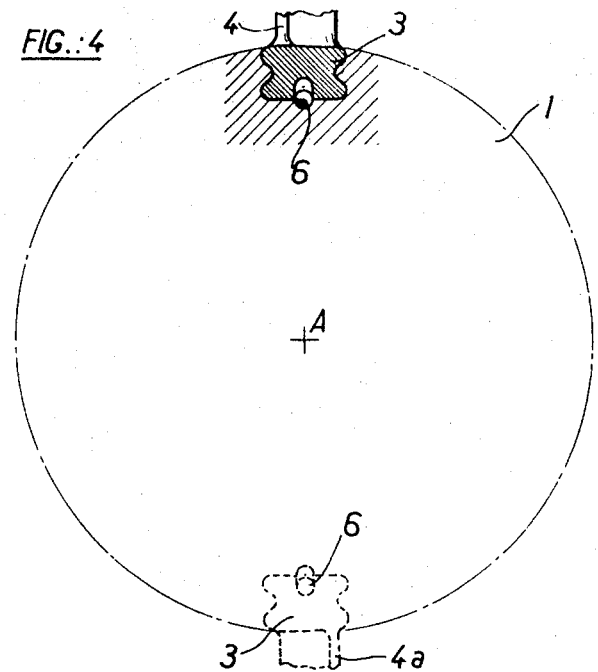

DEVICE FOR LOCKING BLADES OR OTHER SLIDINGLY MOUNTED PARTS IN POSITION ON A ROTOR OR OTHER ROTATING SUPPORT MEANS

This invention relates to the fixing of parts to a support means rotating about a horizontal axis or one inclined to the vertical, more especially the fixing of turbine or compressor blades to a rotor appertaining to a rotating engine. It has for its object a device appropriate for locking into a set position a part that is connected to the rotating support means by a sliding coupling system.

A turbine or compressor rotor is usually provided with grooves parallel to its axis, these being called slots, into which the blade roots engage and are retained, these being thus connected to the rotor hub by a sliding assembly. Known procedures for the axial immobilization of the blades in their slots have recourse to arrangements which are relatively costly, awkward to carry out and to put in place, and require mechanical parts which themselves demand costly and complicated machining. Apart from that, through the nature of these devices and of their technological arrangement, the behaviour of the parts runs the risk of being affected in endurance by reason of the fact that stress concentrations or notch effects are to be feared.

The object of the present invention is to alleviate these drawbacks and to provide a safe and economical means of ensuring the axial immobilization of the turbine or compressor blades. It furthermore makes it possible to bring into being a rotor and blade assembly free of any protusion harmful to the smooth operation of the engine and to its endurance, or giving rise to difficulties in manufacture.

According to the invention, it is possible to ensure the axial immobilization of a blade in its slot by means of two balls each retractable into one of two recesses, one of these being made in the rotor facing a cavity in the root of the blade, and the other being made in the root of the blade facing a recess in the rotor, so that one of the balls will always be caught — either through gravity when the rotor is immobile, or by centrifugal force when it is moving — in the cavity located opposite the recess of the ball. The cavities are of a lesser depth than the diameter of the balls; they are preferably in the form of a hemisphere of the same radius as the balls. The ball which is caught in a cavity therefore also remains caught in its recess located opposite, so that it in effect locks the blade into position in its slot and prevents it from sliding axially.

The axial immobilization of the blade is thus effected in all circumstances by the co-operation of both the recesses and the cavities with the two balls, which are subject merely to the action of gravity and to centrifugal force. They are not directly pushed by any spring or equivalent material device of a kind that would be subject to failures and would make the taking out of the blade practically impossible.

The locking device according to the invention makes it possible with great ease to take a blade out by introducing a metal wire or equivalent tool into a passage which is arranged between the surfaces opposite the rotor and the root of the blade, and which extends from the outside to at least one of the two recesses. In order to proceed to disassembly, the two balls are caused to retract in succession into their respective recesses by causing the rotor to turn through 180° and by forcing the metal wire forward to keep the balls in the retracted position.

Applications of the device according to the invention are not limited to the locking of the blades in their slots. It may be applied more especially to any type of rotating machine in which parts are associated which are liable to undergo axial displacement in relation to each other, and it may for example be applied to the locking into position of rings forming the spacers of an engine rotor composed of discs and spacers. In a still more general way, it is possible to employ two balls which co-operate with their respective recesses and cavities so as to lock any part into position in such a way as to prevent it from sliding axially and/or from rotating in relation to a rotating support means. If the part is of a certain circumferential development, the two balls should naturally be located in one identical axial plane or in two adjacent axial planes so that one of the balls will always be caught in its recess through gravity when the support means is in the stopped position. In other words, the two balls may be located in an identical area of the circumference of the support means or in two diametrically opposite areas. In this latter case, the two recesses will, for example, be made in the rotating support means.

It is also possible, without thereby going beyond the scope of the invention, to replace the balls by immobilizing agents which are of another shape, for example cylindrical, conical, prismatic or pyramidal. The two balls or other immobilizing agents may be movable radially in a single guideway formed by two recesses located opposite each other, in the rotating support means and in the device to be locked into position, the said recesses being appropriate for each receiving one of the locking agents plus a portion of the other locking agent.

The device according to the invention, which is intended to retain against sliding movement a supporting part connected by a sliding coupling to a supported part rotatable about an axis which is horizontal or inclined at a substantial angle to the vertical therefore comprises, in general terms, a pair of retaining members each of which is movable under the influence of gravitational and centrifugal forces, between a recessed position in which the retaining member is retracted in a recess or socket extending substantially radially into one of said parts and registering with a depressed portion or cavity of the other said part, and an operative position in which the retaining member engages simultaneously said recess and a cavity, one of the recesses opening away from the axis, whereby that retaining member which is movable in said one recess will be moved into said retaining position by centrifugal force, and the other opening inwardly toward the axis, whereby that retaining member which is movable in the latter recess will be moved into retaining position by gravitational force. The normal rest position of the rotating supporting part is such that the latter recess extends downwardly in such rest position, while if the supporting part is turned 180° from this resting position, that retaining member which is movable in the first recess will be moved into retaining position by gravitational force.

The invention will now be further described, by way of example, with reference to the accompanying drawings, in which :

FIG. 1 shows an arrangement of one embodiment according to the invention which ensures the axial immobilization of a blade on a turbine-engine rotor as viewed in an axial section taken along line I—I in FIG. 2;

FIGS. 1a and 1b show on a larger scale some details of FIG. 1;

FIG. 2 is a view of a fractional cross-section taken along line II—II in FIG. 1;

FIG. 3 is a fractional view similar to FIG. 1, showing the position of the device when the engine is turning;

FIG. 4 is a view similar to FIG. 2 but on a smaller scale, showing the position of the device when the engine is stopped;

FIG. 5 is a view similar to FIG. 1, showing the taking out of a blade;

FIG. 6 is a cross-sectional view taken along line VI—VI in FIG. 5.

The rotor shown comprises one or more wheels or discs 1 movable in a rotary sense about an axis A. Along the periphery of each wheel 1 there are provided, parallel to the axis A, a plurality of grooves or slots 2. Into each of the said slots 2 the root 3 of a blade such as 4 or 5 is fitted. Each blade root 3 is held within its slot 2 so that it is unable to shift radially but would be able to slide parallel to the axis A if no device for axial immobilization were provided.

The device according to the invention for axial immobilization comprises, in respect of each blade root 3, two identical balls 6 and 7 which are capable of movement radially within two guideways 8 and 9 respectively, the latter being partly in the wheel 1 and partly in the blade root 3. The guideway 8 comprises a recess 10 made in the blade root 3 opposite a cavity 11 in the wheel 1, whereas the guideway 9 comprises a recess 12 made in the wheel 1 opposite a cavity 13 in the blade root 3. Each of the cavities 11 and 13 is a hemispherical dish with the same radius as the balls 6 and 7, and each of the recesses 10 and 12 (see FIGS. 1a and 1b) comprises a hemispherical dish 14 of the same radius at the end of a cylindrical bore 15 with the same radius. The radial height $h$ of the bore 15 is equal to or slightly greater than the radius of the balls. Each of the balls is thus able to shift radially between an inactive position, in which it remains retracted in its recess (FIG. 1b), and an active position, in which it is caught in the cavity (FIG. 1a). In the latter position, the ball locks the blade root 3 and prevents it from sliding in its slot 2.

When with the engine stopped the blade 4 is located in the upper portion of its travel, i.e., above the axis A (FIGS. 1, 2 and 4), the force of gravity urges the ball 6 towards its active position and the ball 7 towards its inactive position. If, on the other hand, the blade 4 is located in the lower portion of its travel (a position shown in chain-dotted lines at 4a in FIG. 4), then the force of gravity urges the ball 6 towards its inactive position and the ball 7 towards its active position. Gravity therefore always urges one of the balls into its active position and the other ball towards its inactive position, so that the blade root 3 always remains locked in its slot by the one of the balls that is thus retained in the active position when the engine is stopped.

When the engine is turning, the two balls are urged in a direction away from the axis A by centrifugal force, so that the ball 6 is retained in its inactive position and the ball 7 is retained in its active position (FIG. 3), thus locking the blade root 3 in its slot 2.

The blades are therefore locked under all circumstances. The security of the locking system is still further reinforced if the blades such as those at 4 and 5 on the wheel 1 are connected to each other, in an already known manner, by an annular shroud arranged either at the periphery of the blades or around a circle with a radius lying intermediately between the roots and the tips of the blades.

In the embodiment shown here, the height $h$ of the cylindrical bore 15 is slightly greater than the radius of the balls so as to make possible disassembly of the device by the introduction of a metal wire through a channel 16 arranged parallel to the axis A in the surfaces opposite the blade root 3 and at the end of its slot 2. To take out the blade 4, it is first brought down to the low point of its travel (the position 4a in FIG. 4), so that the ball 6 retracts into its recess 10, and it is kept in this position by fitting a metal wire 17 through the channel 16 (see FIGS. 5 and 6). The rotor is then turned through 180° (the position in FIGS. 1 and 2), so that the ball 7 retracts into its recess 12. It is then possible to slide the blade root 3 in such a way as to extricate it from its slot 2 after having, if necessary, pressed the metal wire 17 further into the channel 16 so as to ensure the clamping of the ball 7 in the recess 12.

The channel 16 shown in the drawings is formed by two grooves located opposite each other in the facing surfaces of the blade root 3 and of the end of the slot 2 and passing through the two ball guideways 8 and 9 and open through both sides of wheel 1. The channel may however also be formed by means of a single groove in one of the said surfaces and/or may open only through one side of the wheel 1 and in the adjacent ball guideway.

I claim:

1. In a rotary engine comprising a rotor hub and a blade having a blade root which is engaged slidingly within a hub groove adapted to retain the blade root against radial tearing off, oppositely acting detent means for restraining said blade root against sliding movement in said groove, said detent means comprising two balls, a generally radial ball-receiving socket for each ball and a cooperating recess registering with each socket, said recess being of lesser depth than the diameter of said ball and engageable by said ball when partially displaced from said socket, one of said sockets being provided in said rotor hub with the corresponding recess in said blade root and the other of said sockets being provided in said blade root with the corresponding recess in said hub, whereby one of said balls is biased into cavity-engaging position by gravitational forces and the other by centrifugal forces.

2. A device according to claim 1 wherein each said cavity comprises a hemispherical cavity having a diameter substantially equal to the diameter of the corresponding balls.

3. A device according to claim 1 comprising an interfacial passage extending along the hub groove between the rotor hub and the blade root and leading to at least one of said recesses, the passage being adapted to accommodate an elongated tool for positively maintaining the corresponding ball in said recess.

4. In a system comprising a supporting part rotatable about an axis which is horizontal or inclined at a substantial angle to the vertical, and a supported part mounted in sliding engagement with said supporting part, a device for retaining the supported part against sliding movement relative to the supporting part, comprising a pair of retaining members each of which is movable under the influence of gravitational and centrifugal forces, between a recessed position in which the retaining member is retracted in a recess extending substantially radially into one of said parts and registering with a cavity in the other part, and a projected operative position in which the retaining member engages simultaneously said recess and said cavity, one of said recesses opening away from the axis, whereby that retaining member which is movable in this recess will be moved into said retaining position by centrifugal force, and the other recess opening inwardly toward said axis and extending downwardly in the rest position of said supporting part whereby that retaining member which is movable in the other recess will be moved into said operative position by gravitational forces in said resting position of the supporting part.

5. A device according to claim 4 comprising an interfacial passage extending between the supporting and supported parts and leading to at least one of the recesses, the passage being adapted to accommodate an elongated tool for positively maintaining the corresponding retaining member in said recess.

* * * * *